US008519885B2

(12) United States Patent
Ash, Jr. et al.

(10) Patent No.: US 8,519,885 B2
(45) Date of Patent: Aug. 27, 2013

(54) COMBINATION HAND-HELD PHONE AND RADAR SYSTEM

(75) Inventors: Daniel R. Ash, Jr., Laguna Niguel, CA (US); Daniel R. Ash, Sr., Drain, OR (US); Joseph Storniolo, Huntington Beach, CA (US)

(73) Assignee: Mobile Joose, Inc., Lake Forrest, CA (US)

( * ) Notice: Subject to any disclaimer, the term of this patent is extended or adjusted under 35 U.S.C. 154(b) by 0 days.

(21) Appl. No.: 13/590,053

(22) Filed: Aug. 20, 2012

(65) Prior Publication Data
US 2013/0069816 A1    Mar. 21, 2013

Related U.S. Application Data

(63) Continuation-in-part of application No. 13/238,894, filed on Sep. 21, 2011, now Pat. No. 8,248,314.

(51) Int. Cl.
*G01S 13/08*    (2006.01)
*H04M 1/00*    (2006.01)

(52) U.S. Cl.
USPC .................. 342/134; 455/90.3; 455/575.1

(58) Field of Classification Search
USPC ................. 455/90.3, 575.8, 575.1, 128, 41.2, 455/556.1; 342/134, 104
See application file for complete search history.

(56) References Cited

U.S. PATENT DOCUMENTS

| 7,207,902 | B1* | 4/2007 | Hamlin ...................... 473/353 |
| 8,004,454 | B2* | 8/2011 | Lindoff et al. ............... 342/134 |
| 8,275,412 | B2* | 9/2012 | Alameh et al. ............. 455/556.1 |
| 2001/0051537 | A1 | 12/2001 | Nakamura et al. |
| 2002/0154066 | A1 | 10/2002 | Barna et al. |
| 2005/0088345 | A1 | 4/2005 | DeLa Torre Barreiro |
| 2006/0052112 | A1* | 3/2006 | Baussi et al. ............... 455/456.1 |
| 2007/0218951 | A1 | 9/2007 | Risheq et al. |
| 2010/0075595 | A1 | 3/2010 | DeMarco et al. |

* cited by examiner

*Primary Examiner* — Sonny Trinh
(74) *Attorney, Agent, or Firm* — Patent Law & Venture Group; Gene Scott

(57) ABSTRACT

A hand-held apparatus has a Doppler radar secured within one wall of a phone sleeve. A phone may be placed within the sleeve and in signal communication with the radar via a connector molded in the sleeve. In operation, an RF signal may be directed toward a distant moving target and a bounce signal received. The speed of the target is calculated from the Doppler frequency shift and displayed by the phone to the user.

8 Claims, 6 Drawing Sheets

COMBINATION HAND-HELD PHONE AND RADAR SYSTEM

RELATED APPLICATION

This application is a Continuation-In-Part application of non-provisional application Ser. No. 13/238,894, filed on Sep. 21, 2011, and claims international date priority thereof. Application Ser. No. 13/238,894 is hereby incorporated herein by reference in its entirety.

BACKGROUND

This disclosure relates to the fields of telephony and radar technology, and more particularly to a combination phone and radar within a carrying sleeve or case.

The well-known Doppler effect may be considered to be the difference between the frequency of an emitted radio wave impinging on a moving target, and the frequency of an observed reflected wave from the target. It is assumed that the emitted wave frequency is known. The frequency of reflected waves from the target is observed to arrive at an ever decreasing rate when the target is receding from the observer and at an ever increasing rate when the target is approaching since the distance between the object and the emitter is continually changing. The frequency difference between original and reflected waves is referred to as the Doppler shift and the formula for determining it is:

$$F_r = F_t(1+v/c)/(1-v/c)$$

Where:
  c is the speed of light in the medium of the measurement
  v is the velocity of the object;
  $F_t$ is the emitter frequency; and
  $F_r$ is the observed frequency.
The Doppler shift $F_d$ is given by:

$$F_d = F_r - F_t = 2v(f_t/(c-v))$$

Since we assume that v<<c, (c-v) approaches c and;
  $F_d \cong 2v(F_t/c)$ and we ears solve for the speed of the object:

$$v = F_d/2(F_t/c)$$

In addition to telephony, modern phones also support a wide variety of other services such as text messaging, MMS, email, Internet access, and short-range wireless communications including those operating with infrared and Bluetooth signals, business applications, gaming, and photography. Phones are ubiquitous in society today and are finding new applications continuously. Beside military use and commercial aviation, radar is used in industry in a wide range of applications as well as in professional sports, in auto racing and so on. There is a need for radar speed detection by the general public including determining the speed of baseballs in little league, high school and college play, and the speed of model airplanes in amateur racing just to mention two applications. This disclosure teaches an apparatus and method using a combination phone and Doppler radar to fulfill this need.

SUMMARY

The presently described system is conceived as a hand-held portable electronic device capable of measuring the speed of a distant moving object (a target) and presenting this information to one or more of a display screen, a memory device, and a transmitter. It is considered critical that the system be relatively small and light-weight so as to be hand-held and portable. The system is conceived as an electronic device capable of speed detection, targeting, displaying, wireless communication, and information storage. It is important to provide the system at a reasonable commercial price as it is directed to the general public and is meant for a mass market and to be manufactured in large quantities. It is possible to meet these objectives by integrating a Doppler radar into a sleeve into which a phone may be fitted. This approach meets the objective of low manufacturing cost and selling price by using an existing phone for much of the system's capability. It also meets the need for convenience since the radar may be employed only when desired without adding bulk and complexity to the phone during its normal use. This system enables the use of radar technology in conjunction with wireless telephony, computation, interactive, control and display capabilities for radar speed measurements.

A critical object of the present disclosure is to provide a combination electronic device capable of meeting the following objectives with a low cost of manufacture resulting in a relatively low commercial price to the public.

A further object is to measure and display information related to the speed of a distant object relative to the electronic device.

A further object is to transmit this information wirelessly.

A further object is to store this information in a memory device.

A further object is to enable temporary integration of the capabilities of a radar with those of a phone.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawing figures indicate like elements.

DETAILED DESCRIPTION

Figure 1:
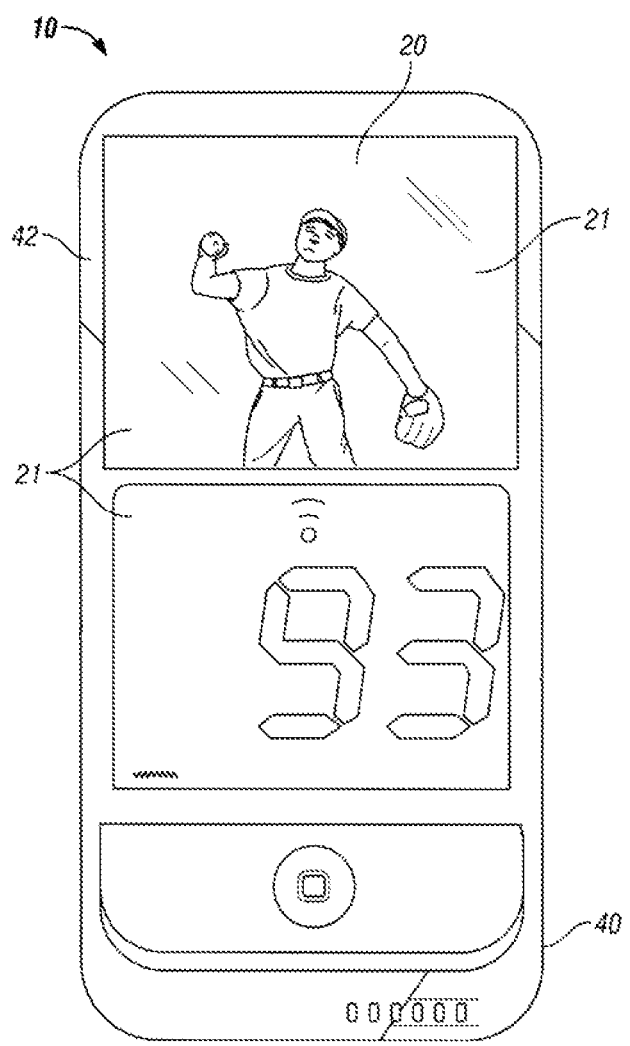
FIG. 1 is an example front plan view of the presently described system showing a video picture and numerical display on a cell phone thereof.

The presently disclosed apparatus is a combination system 10 including a phone 20 and a radar 38, the radar 30 encased within a wall 32 of a phone sleeve 40. FIG. 1 shows the phone 20 within sleeve 40. Sleeve 40 has a thin peripheral rim 42 so that the front face of phone 20 is visible. A display 21 of phone 20 shows a video picture and a numeric presentation, as will be understood from the following description. The term "phone" is used herein to represent any hand-held portable, mobile, or personal telephony device and particularly a smart cell phone. The term "radar" is used herein, to represent a radar system and particularly a Doppler radar system.

Figure 2:
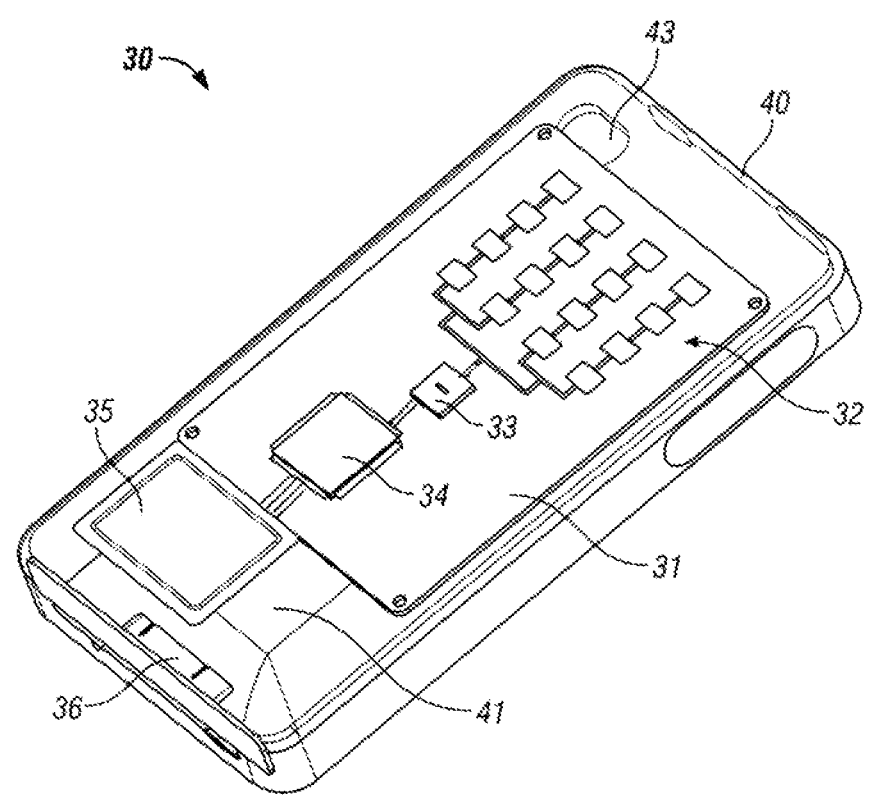
FIG. 2 is an example perspective rear view of a sleeve of the system, the sleeve shown with its exterior back panel removed for illustrating electrical components under the back panel.

In FIG. 2 illustrates the sleeve 40, shown here as transparent so as to show several components of the radar 30 including: a circuit hoard 31 on which is mounted an antenna 32, a processor chip CPU 33, a radar transceiver 34, a battery 35, and an electrical connector 36. Radar 30 is secured or encased within a near wall 41 of sleeve 40 so that electrical components: 31, 32, 33, 34, and 35 are not normally visible. Rear wall 41 has an aperture 43 through which a phone camera 21 of phone 20 is able to view and record distant objects which may then be presented on phone display 25 as seen in FIG. 1.

Figure 3:
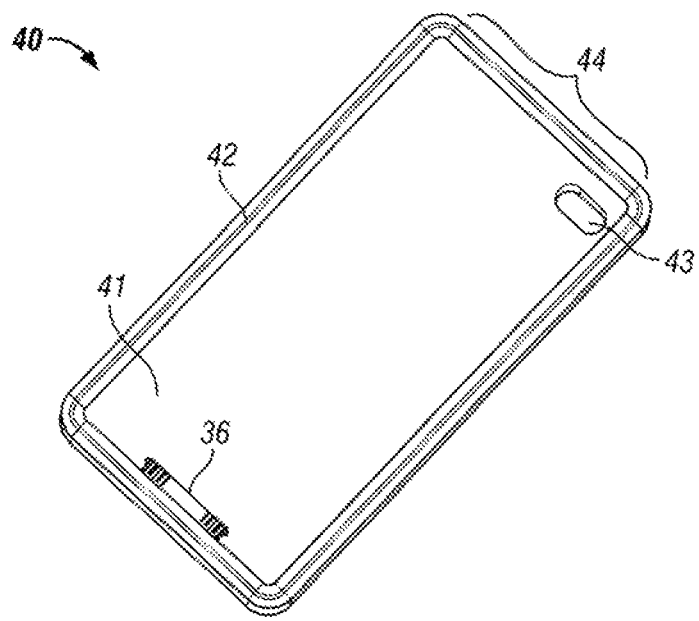
FIG. 3 is an example front plan view of the sleeve.

FIG. 3 shows sleeve 40 including rear wall 41, peripheral rim 42, aperture 43, and connector 36. An opening 44 in the side wall at one end of sleeve 40 for accepting phone 20 is not visible but its location is depicted.

Figure 4:
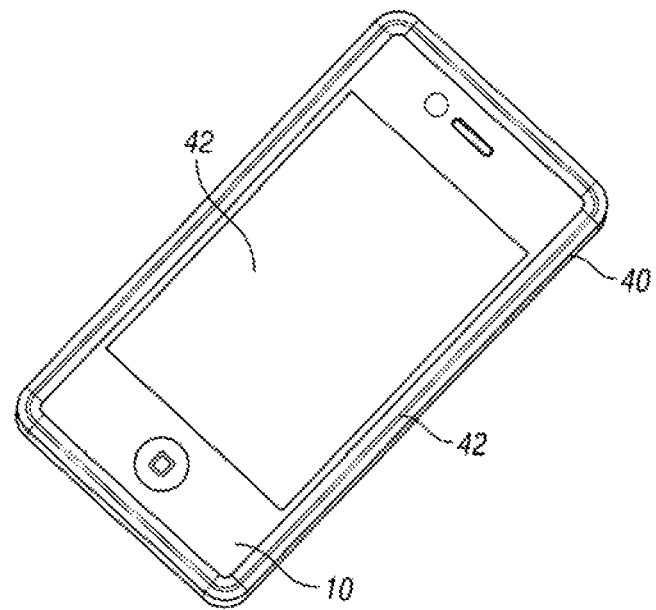
FIG. 4 is an example front plan view of the cell phone in the sleeve.

FIG. 4 shows phone 20 positioned and fully seated within sleeve 40 after being inserted through opening 44, and it is clear that display 21 is visible to the user. Peripheral rim 42 secures phone 20 within sleeve 40. When fully inserted phone 20 engages connector 36 so that signals may be exchanged between phone 20 and radar 30. U.S. application Ser. No. 13/238,894 which is incorporated by reference herein discloses a proximity induction method for signal transfer between phone 20 and radar 30 and this method may be used in place of, or in conjunction with a direct contact approach which connector 36 provides. Still further, since the circuits of both phone 20 and radar 30 include transceivers, signal transfer therebetween may be conducted wirelessly.

Figure 5:
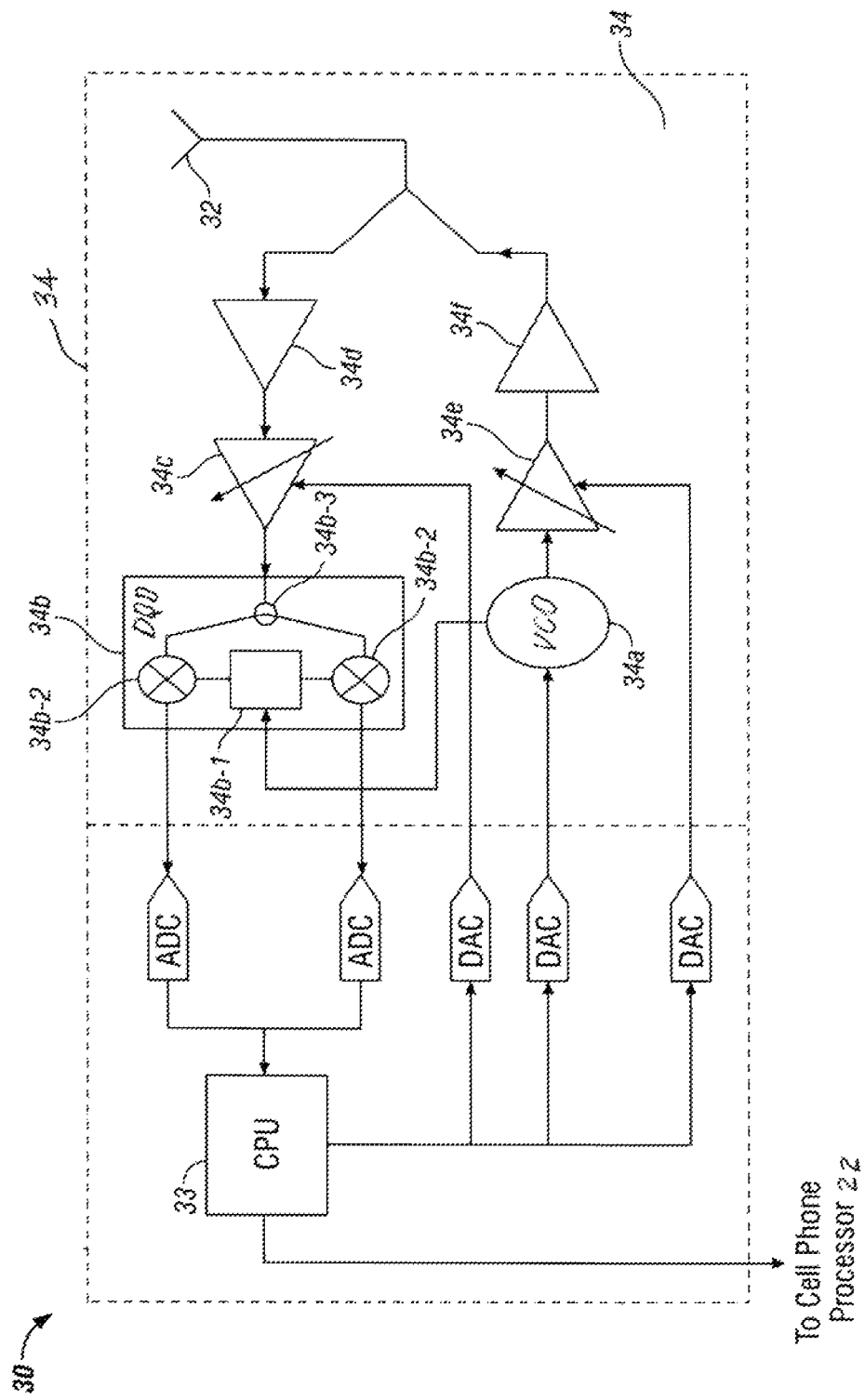
FIG. 5 is an example electrical schematic diagram of the radar.

The electrical arrangement and interconnection of the components of radar 30 is shown in FIG. 5. Radar 30 includes radar transceiver 34, antenna 32, CPU 33, an ADC and DAC network, battery 35 and connector 36 both of which are shown in FIG. 2. Transceiver 34 is designed for rapid measurements and includes: a VCO 34a (voltage controlled oscillator), a DQD 34b (direct quadrature demodulator), two VGA 34c, 34e (variable gain amplifiers), an LNA 34d (low noise amplifier) and common frequency control and modulation elements (not shown). Transceiver 34 also includes a power amplifier 34f. VCO 34a generates a sinusoidal RF output at a selected transmit frequency in the microwave range. VCO 34a is tuned and controlled by a typical frequency control and modulation circuit (not shown). The output of VCO 34a is amplified at VGA 34e, and high gain transmit amplifier 34f and then delivered to antenna 32 which propagates RF energy sample bursts at the selected frequency. Variable gain is included in the transmit path as a means to calibrate transmit power. The output signal of VCO 34a is also delivered to the DQD 34b which is comprised of a +45/−45 degree phase splitter 34b-1 two mixers 34b-2 and an input signal splitter 34b-3.

The LNA 34d and VGA 34e boost the received signal. The LNA 34d is required in the receive signal path to provide gain while minimizing noise and maximizing sensitivity. VGA 34c is included in the receive path to optimize for range. The gain of VGA 34c is adjusted dynamically by a signal from CPU 33 based on detected signal strength. The RF splitter 34b-1 presents equal parts of the transmitted signal to each of the RF mixers 34b-2. In addition, splitter 34b-1 produces a local oscillator signal, which arrives at the mixers 34b-2 in phase quadrature or 90 degrees out of phase. The outputs of the mixers 34b-2 are digitized and sampled at CPU 33 where Doppler frequency shift and target speed are calculated, A signal containing target, speed is sent, to the phone processor 22 for display, storage, transmission or otherwise. All radar signal processing may be performed by CPU 33 or by the phone processor 22.

Separate transmit and receive antennas may be used or a single antenna 32 may be used as shown here. A number of different well, known antenna designs are applicable including a planar array of patch antenna elements as shown in FIG. 2, which provides the necessary gain and directivity. When a single antenna is employed, well-known RF power splitting and combining techniques are used. The antenna 32 radiates the RF output of amplifier 34f in the direction of a selected distant moving target 5. Alternatively, target 5 may be stationary white system 10 is moving. Target 5 and system 10 may both be moving wherein, the net convergence or divergence speed will be calculated.

Figure 6:
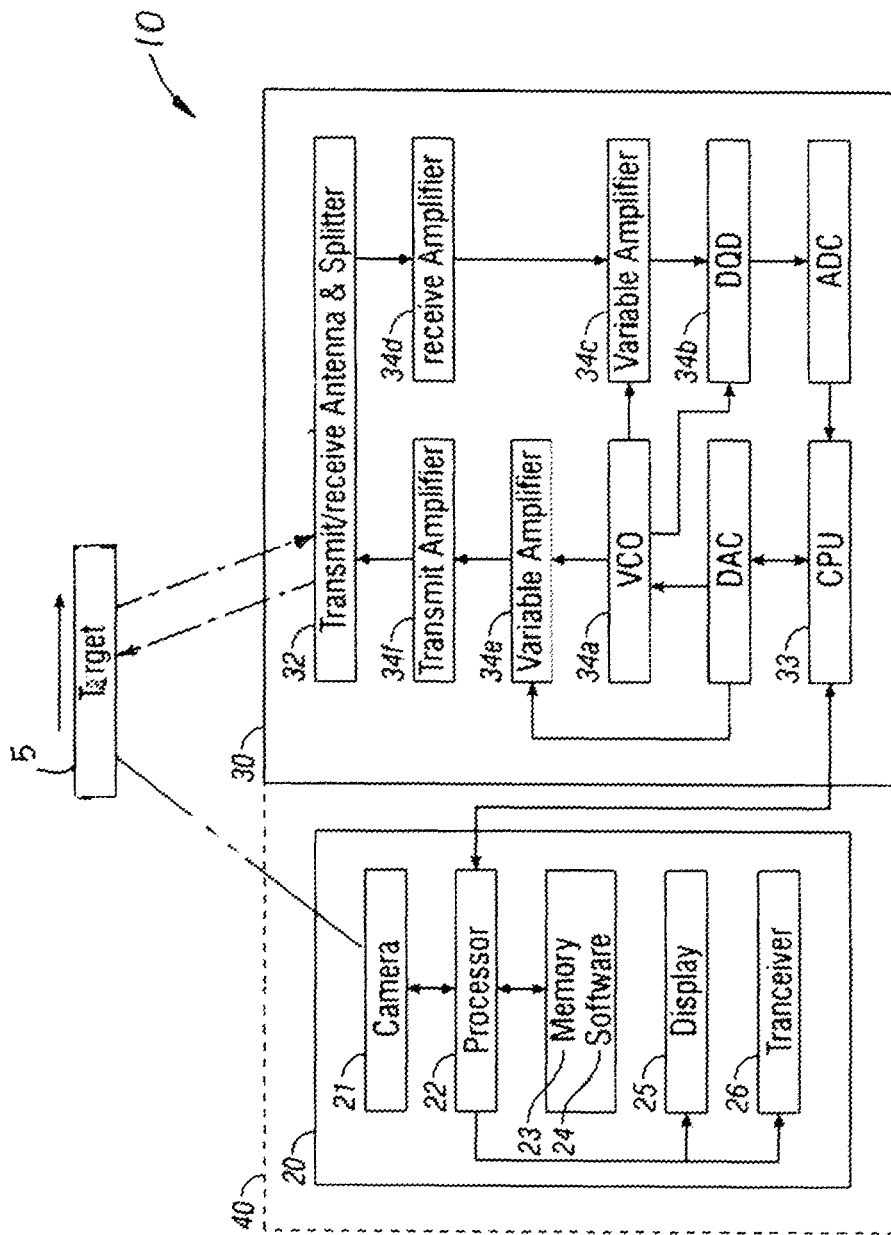
FIG. 6 is an example conceptual block diagram of the system showing its relationship to a distant moving object whereby the cell phone has visual access to the object and the radar has radar signal access to the object.
Figure 7:
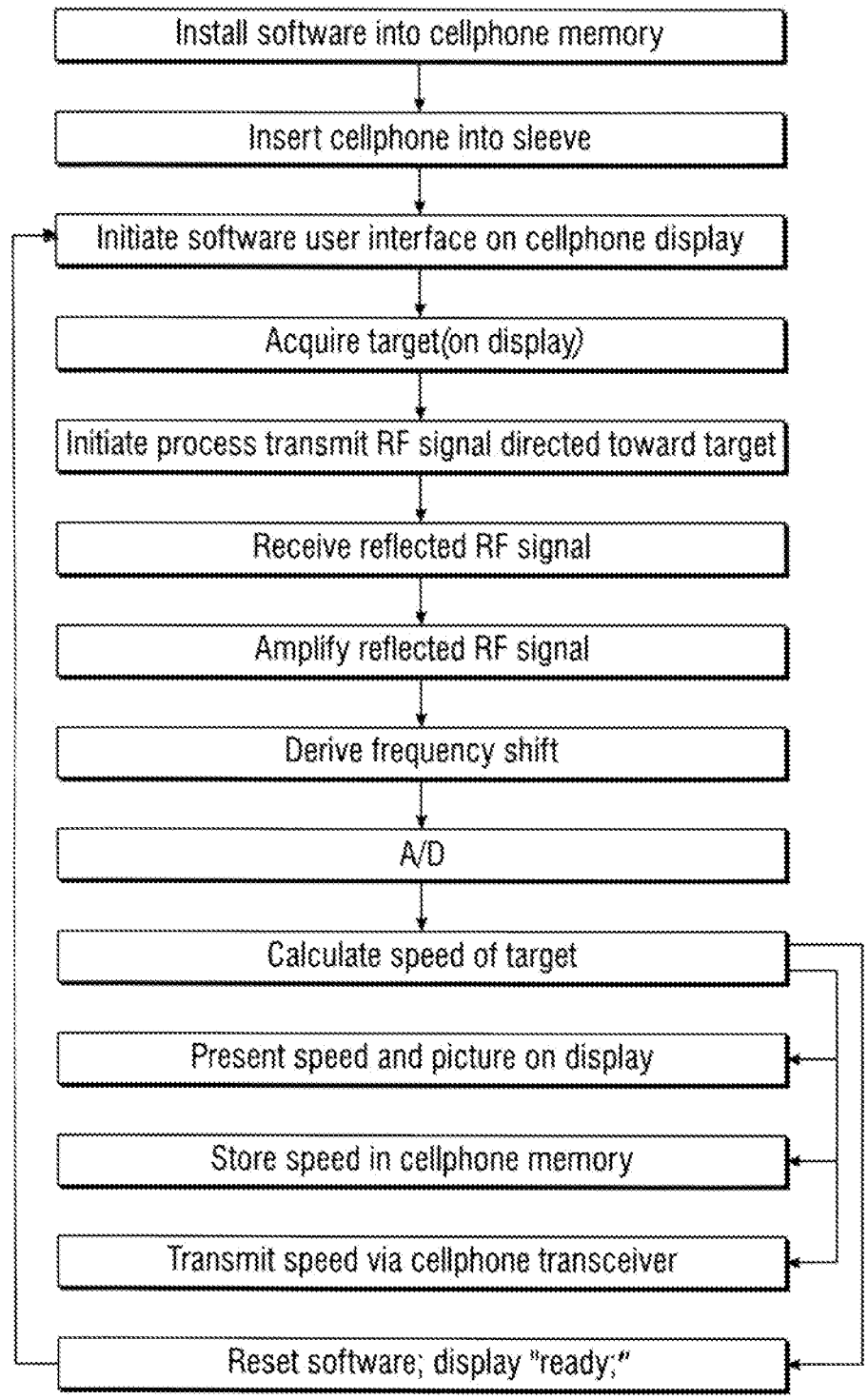
FIG. 7 is an example logical diagram of a method of operation of the system.

In use, a person holding system 10 begins by starting an application software 24 stored in phone memory 23 (FIG. 6). The software 24 displays a user interface on the phone display 25. When the user is ready to acquire a speed measurement, the user aims the system 10 at a target 5. This may be accomplished with or without displaying the target 5 on display 25. Once the user is sure the target 5 is acquired, that is, within range and the solid angle of the RF output, a soft key on display 25 is selected by the user, and this initiates the speed measuring process including transmitting the RF signal toward target 5 and receiving the reflected signal. The received signal is processed as described above and the frequency shift is calculated. The speed is presented on display 25 as shown in FIG. 1. It may also be stored in cellphone memory 23, or transmitted via phone transceiver 26. Finally, the software enables a ready announcement on phone display 25 showing that the measurement cycle is complete and is ready for a further cycle which may be initiated in the same manner. This process is shown in the step-by-step diagram of FIG. 7.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. A hand-held system measures the speed of a distant moving target, the system comprising:
   a phone sleeve having a front wall and a rear wall;
   a phone within the phone sleeve, a display of the phone visible through an open portion of the front wall, a camera of the phone visible through an aperture of the rear wall;
   a radar engaged within a rear wall of the sleeve, an antenna of the radar facing away from the front wall; and
   the phone and the radar enabled for mutual signal communication.

2. The system of claim 1 wherein the mutual signal communication is by at least one of electrical conduction, wireless transmission, and proximity inductive signal transfer.

3. The system of claim 1 wherein a circuit of the radar includes the antenna, an amplifier, a frequency shifter, a demodulator, and a means for converting between analog and digital signals.

4. A phone sleeve for a hand-held system for measuring a speed of a distant, moving target, the phone sleeve comprising:
   a front wall and a rear wall:
   a space between the walls sufficient for insertion of a phone therein;
   an open portion of the front wall sufficient for viewing a display of the phone;
   an aperture in the rear wall sufficient for enabling picture taking by a rear-looking phone camera; and a space within the rear wall sufficient for receiving a radar circuit.

5. The phone sleeve of claim 4 wherein the radar circuit is molded within the rear wall.

6. The phone sleeve of claim 4 further comprising an electrical connector of the radar circuit located for receiving the phone in signal conduction.

7. A process for determining the speed of a distant moving target using a hand-held device, the process comprising
   a) installing a software into a phone memory of a hand-held portable phone;
   b) inserting the phone into a sleeve having a radar system therein;
   c) initiating the software thereby producing a graphical user interface on a display of the phone;
   d) acquiring the target using a camera of the phone and storing a picture of the target;
   e) transmitting a primary signal toward the target;
   f) receiving a reflected signal from the target;
   g) deriving a frequency shift between the primary and reflected signals;
   h) calculating a speed of the target from the frequency shift;
   i) presenting the target speed and the picture of the target on the display.

8. The process of claim 7 further comprising storing the target speed and the picture in the phone memory.

\* \* \* \* \*